(12) United States Patent
Ly et al.

(10) Patent No.: US 8,386,637 B2
(45) Date of Patent: Feb. 26, 2013

(54) CONNECTION FORWARDING

(75) Inventors: Kand Ly, Richmond, CA (US); Joshua Tseng, Redwood City, CA (US); Steve McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 13/410,032

(22) Filed: Mar. 1, 2012

(65) Prior Publication Data

US 2012/0166661 A1    Jun. 28, 2012

Related U.S. Application Data

(60) Continuation of application No. 12/331,257, filed on Dec. 9, 2008, now Pat. No. 8,140,690, which is a division of application No. 11/377,906, filed on Mar. 15, 2006.

(60) Provisional application No. 60/663,366, filed on Mar. 18, 2005.

(51) Int. Cl.
*G06F 15/173* (2006.01)

(52) U.S. Cl. ...................................................... 709/238

(58) Field of Classification Search .................. 709/238, 709/227

See application file for complete search history.

(56) References Cited

U.S. PATENT DOCUMENTS

| | | |
|---|---|---|
| 4,641,274 A | 2/1987 | Swank |
| 4,988,998 A | 1/1991 | O'Brien |
| 5,371,852 A | 12/1994 | Attanasio et al. |
| 5,414,850 A | 5/1995 | Whiting |
| 5,737,594 A | 4/1998 | Williams |
| 5,754,774 A | 5/1998 | Bittinger et al. |
| 5,771,355 A | 6/1998 | Kuzma |
| 5,822,746 A | 10/1998 | Williams |
| 5,838,963 A | 11/1998 | Griffiths |
| 5,867,661 A | 2/1999 | Bittinger et al. |
| 5,903,723 A | 5/1999 | Beck et al. |
| 5,926,834 A | 7/1999 | Carlson et al. |
| 5,931,913 A | 8/1999 | Meriwether et al. |
| 5,941,988 A | 8/1999 | Bhagwat et al. |
| 5,977,890 A | 11/1999 | Rigoutsos et al. |

(Continued)

FOREIGN PATENT DOCUMENTS

| | | |
|---|---|---|
| EP | 0813326 A | 12/1997 |
| EP | 1056279 | 9/2001 |

(Continued)

OTHER PUBLICATIONS

"Unleashing the True Power of Today's Networks," A Peribit White Paper, Aug. 2002, pp. 1-13, URL=http://www.peribitcom/products/etc/0217w02punl.htm.

(Continued)

*Primary Examiner* — David Eng
(74) *Attorney, Agent, or Firm* — Philip H. Albert; Kilpatrick Townsend & Stockton LLP

(57) ABSTRACT

Two or more network traffic processors connected with the same LAN and WAN are identified as neighbors. Neighboring network traffic processors cooperate to overcome asymmetric routing, thereby ensuring that related sequences of network traffic are processed by the same network proxy. A network proxy can be included in a network traffic processor or as a standalone unit. A network traffic processor that intercepts a new connection initiation by a client assigns a network proxy to handle all messages associated with that connection. The network traffic processor conveys connection information to neighboring network traffic processors. The neighboring network traffic processors use the connection information to redirect network traffic associated with the connection to the assigned network proxy, thereby overcoming the effects of asymmetric routing. The assigned network proxy handles redirected network traffic in much the same way that it would handle network traffic received directly.

30 Claims, 7 Drawing Sheets

U.S. PATENT DOCUMENTS

| | | | |
|---|---|---|---|
| 5,990,810 A | 11/1999 | Williams | |
| 5,999,949 A | 12/1999 | Crandall | |
| 6,009,462 A | 12/1999 | Birrell et al. | |
| 6,076,084 A | 6/2000 | Harlan | |
| 6,085,193 A | 7/2000 | Malkin et al. | |
| 6,118,786 A | 9/2000 | Tiernan et al. | |
| 6,138,162 A | 10/2000 | Pistriotto et al. | |
| 6,163,811 A | 12/2000 | Porter | |
| 6,173,318 B1 | 1/2001 | Jackson et al. | |
| 6,178,461 B1 | 1/2001 | Chan et al. | |
| 6,219,642 B1 | 4/2001 | Asghar et al. | |
| 6,233,253 B1 | 5/2001 | Settle et al. | |
| 6,253,264 B1 | 6/2001 | Sebastian | |
| 6,311,216 B1 | 10/2001 | Smith et al. | |
| 6,330,561 B1 | 12/2001 | Cohen et al. | |
| 6,347,342 B1 | 2/2002 | Marcos et al. | |
| 6,369,723 B1 | 4/2002 | Pieterse et al. | |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,658 B1 | 9/2002 | Lafe et al. | |
| 6,473,406 B1 | 10/2002 | Coile et al. | |
| 6,487,538 B1 | 11/2002 | Gupta et al. | |
| 6,519,576 B1 | 2/2003 | Freeman | |
| 6,546,428 B2 | 4/2003 | Baber et al. | |
| 6,553,141 B1 | 4/2003 | Huffman | |
| 6,563,517 B1 | 5/2003 | Bhagwat et al. | |
| 6,574,618 B2 | 6/2003 | Eylon et al. | |
| 6,578,073 B1 | 6/2003 | Starnes et al. | |
| 6,598,081 B1 | 7/2003 | Coile et al. | |
| 6,622,168 B1 | 9/2003 | Datta | |
| 6,642,860 B2 | 11/2003 | Meulenbroeks | |
| 6,643,287 B1 | 11/2003 | Callon et al. | |
| 6,667,700 B1 | 12/2003 | McCanne et al. | |
| 6,678,828 B1 | 1/2004 | Zhang et al. | |
| 6,701,374 B2 | 3/2004 | Gupta et al. | |
| 6,704,730 B2 | 3/2004 | Moulton et al. | |
| 6,721,780 B1 | 4/2004 | Kasriel et al. | |
| 6,728,748 B1 | 4/2004 | Mangipudi et al. | |
| 6,742,043 B1 | 5/2004 | Moussa et al. | |
| 6,751,221 B1 | 6/2004 | Saito et al. | |
| 6,751,608 B1 | 6/2004 | Cohen et al. | |
| 6,757,733 B2 | 6/2004 | Gupta | |
| 6,772,193 B1 | 8/2004 | Igawa et al. | |
| 6,789,255 B1 | 9/2004 | Pedrizetti et al. | |
| 6,820,132 B1 * | 11/2004 | Puente et al. | 709/238 |
| 6,820,133 B1 | 11/2004 | Grove et al. | |
| 6,822,955 B1 | 11/2004 | Brothers et al. | |
| 6,839,682 B1 | 1/2005 | Blume et al. | |
| 6,856,651 B2 | 2/2005 | Singh | |
| 6,871,235 B1 | 3/2005 | Cain | |
| 6,874,017 B1 | 3/2005 | Inoue et al. | |
| 6,883,035 B2 | 4/2005 | Hannu et al. | |
| 6,892,235 B1 | 5/2005 | Daude et al. | |
| 6,894,981 B1 | 5/2005 | Coile et al. | |
| 6,940,835 B2 | 9/2005 | Reza et al. | |
| 6,959,318 B1 | 10/2005 | Tso | |
| 6,973,485 B2 | 12/2005 | Ebata et al. | |
| 6,981,029 B1 | 12/2005 | Menditto et al. | |
| 7,016,973 B1 | 3/2006 | Sibal et al. | |
| 7,047,315 B1 | 5/2006 | Srivastava | |
| 7,047,485 B1 | 5/2006 | Klein et al. | |
| 7,058,699 B1 | 6/2006 | Chiou et al. | |
| 7,065,781 B1 | 6/2006 | Entwistle | |
| 7,082,456 B2 | 7/2006 | Mani-Meitav et al. | |
| 7,092,370 B2 | 8/2006 | Jiang et al. | |
| 7,120,666 B2 | 10/2006 | McCanne et al. | |
| 7,123,613 B1 | 10/2006 | Chawla et al. | |
| 7,124,169 B2 | 10/2006 | Shimozono et al. | |
| 7,149,817 B2 | 12/2006 | Pettey | |
| 7,161,947 B1 | 1/2007 | Desai | |
| 7,162,529 B2 | 1/2007 | Morishige et al. | |
| 7,181,523 B2 | 2/2007 | Sim | |
| 7,224,839 B2 | 5/2007 | Zeineh | |
| 7,227,872 B1 * | 6/2007 | Biswas et al. | 370/465 |
| 7,230,949 B2 | 6/2007 | Bharali et al. | |
| 7,280,557 B1 * | 10/2007 | Biswas et al. | 370/465 |
| 7,289,505 B2 | 10/2007 | Sanchez et al. | |
| 7,316,028 B2 | 1/2008 | Donatelli et al. | |
| 7,318,100 B2 | 1/2008 | Demmer et al. | |
| 7,336,682 B2 | 2/2008 | Singh | |
| 7,370,120 B2 | 5/2008 | Kirsch et al. | |
| 7,376,085 B2 | 5/2008 | Yazaki et al. | |
| 7,480,711 B2 | 1/2009 | Lownsbrough et al. | |
| 7,602,819 B2 | 10/2009 | Leyendecker | |
| 7,610,393 B1 | 10/2009 | Chen et al. | |
| 7,619,545 B2 | 11/2009 | Samuels et al. | |
| 7,650,416 B2 | 1/2010 | Wu et al. | |
| 7,735,139 B1 * | 6/2010 | Chou et al. | 726/24 |
| 7,769,834 B2 * | 8/2010 | Ly et al. | 709/220 |
| 7,809,818 B2 | 10/2010 | Plamondon | |
| 7,827,237 B2 | 11/2010 | Plamondon | |
| 7,839,769 B2 * | 11/2010 | Veits | 370/219 |
| 7,853,699 B2 | 12/2010 | Wu et al. | |
| 7,865,585 B2 | 1/2011 | Samuels et al. | |
| 7,916,047 B2 | 3/2011 | Samuels et al. | |
| 5,990,810 C1 | 4/2011 | Williams | |
| 7,983,207 B2 * | 7/2011 | Lai et al. | 370/312 |
| 8,032,641 B2 * | 10/2011 | Li et al. | 709/227 |
| 8,069,225 B2 | 11/2011 | McCanne et al. | |
| 8,130,747 B2 * | 3/2012 | Li et al. | 370/351 |
| 8,140,690 B2 * | 3/2012 | Ly et al. | 709/228 |
| 2001/0051927 A1 | 12/2001 | London et al. | |
| 2002/0013853 A1 | 1/2002 | Baber et al. | |
| 2002/0023145 A1 | 2/2002 | Orr et al. | |
| 2002/0029326 A1 | 3/2002 | Reuter et al. | |
| 2002/0038371 A1 | 3/2002 | Spacey | |
| 2002/0062384 A1 | 5/2002 | Tso | |
| 2002/0062388 A1 | 5/2002 | Ogier et al. | |
| 2002/0087547 A1 | 7/2002 | Kausik et al. | |
| 2002/0091801 A1 | 7/2002 | Lewin et al. | |
| 2002/0092026 A1 | 7/2002 | Janniello et al. | |
| 2002/0103778 A1 | 8/2002 | Saxena | |
| 2002/0107971 A1 | 8/2002 | Bailey et al. | |
| 2002/0138511 A1 | 9/2002 | Psounis et al. | |
| 2002/0147895 A1 | 10/2002 | Glance et al. | |
| 2002/0156911 A1 | 10/2002 | Croman et al. | |
| 2002/0157019 A1 | 10/2002 | Kadyk et al. | |
| 2002/0161904 A1 | 10/2002 | Tredoux et al. | |
| 2002/0165911 A1 | 11/2002 | Gabber et al. | |
| 2002/0169818 A1 | 11/2002 | Stewart et al. | |
| 2002/0169828 A1 | 11/2002 | Blanchard | |
| 2002/0194382 A1 | 12/2002 | Kausik et al. | |
| 2003/0009583 A1 | 1/2003 | Chan et al. | |
| 2003/0026258 A1 | 2/2003 | Takatani et al. | |
| 2003/0043802 A1 | 3/2003 | Yazaki et al. | |
| 2003/0043844 A1 | 3/2003 | Heller | |
| 2003/0046369 A1 | 3/2003 | Sim et al. | |
| 2003/0055826 A1 | 3/2003 | Graham | |
| 2003/0065711 A1 | 4/2003 | Acharya et al. | |
| 2003/0105837 A1 | 6/2003 | Kamen et al. | |
| 2003/0115488 A1 | 6/2003 | Kunito et al. | |
| 2003/0163646 A1 | 8/2003 | O'Neil | |
| 2003/0212739 A1 | 11/2003 | Boucher et al. | |
| 2003/0217151 A1 | 11/2003 | Roese et al. | |
| 2003/0225889 A1 | 12/2003 | Moutafov | |
| 2004/0088376 A1 | 5/2004 | McCanne et al. | |
| 2004/0128393 A1 | 7/2004 | Blakley et al. | |
| 2004/0133688 A1 | 7/2004 | Takamatsu | |
| 2004/0162901 A1 | 8/2004 | Mangipudi et al. | |
| 2004/0215717 A1 | 10/2004 | Seifert et al. | |
| 2004/0215746 A1 | 10/2004 | McCanne et al. | |
| 2004/0243703 A1 | 12/2004 | Demmer et al. | |
| 2004/0264481 A1 | 12/2004 | Darling et al. | |
| 2005/0030975 A1 | 2/2005 | Wright et al. | |
| 2005/0038865 A1 | 2/2005 | Noda et al. | |
| 2005/0044242 A1 | 2/2005 | Stevens et al. | |
| 2005/0060426 A1 | 3/2005 | Samuels et al. | |
| 2005/0076099 A1 | 4/2005 | Wang et al. | |
| 2005/0100035 A1 | 5/2005 | Chiou et al. | |
| 2005/0128975 A1 | 6/2005 | Kobayashi et al. | |
| 2005/0135360 A1 | 6/2005 | Shin et al. | |
| 2005/0152318 A1 | 7/2005 | Elbatt et al. | |
| 2005/0198351 A1 | 9/2005 | Nog et al. | |
| 2005/0234643 A1 | 10/2005 | Abraham et al. | |
| 2006/0010442 A1 | 1/2006 | Desai et al. | |
| 2006/0155864 A1 | 7/2006 | Izumi | |

| | | | |
|---|---|---|---|
| 2006/0212935 | A1 | 9/2006 | Burman et al. |
| 2006/0268944 | A1 | 11/2006 | Xu |
| 2006/0274718 | A1 | 12/2006 | Butenweg et al. |
| 2008/0320154 | A1 | 12/2008 | Demmer et al. |

FOREIGN PATENT DOCUMENTS

| | | | |
|---|---|---|---|
| JP | 62-050952 A | | 3/1987 |
| JP | 10-198680 A | | 7/1998 |
| JP | 11-168390 A | | 6/1999 |
| JP | 2002-359649 A | | 12/2002 |
| JP | 2003-110604 A | | 4/2003 |
| JP | 2004254039 A | | 9/2004 |
| WO | WO 95/20793 A | | 8/1995 |
| WO | WO 98/16067 A2 | | 4/1998 |
| WO | WO 00/13110 A | | 3/2000 |
| WO | WO 01-63420 A | | 8/2001 |
| WO | WO 01/65831 A2 | | 9/2001 |
| WO | WO 01/80022 A | | 10/2001 |
| WO | WO 01/97526 | | 12/2001 |
| WO | WO 02/054699 A | | 7/2002 |

OTHER PUBLICATIONS

Amer et al., "File Access Prediction with Adjustable Accuracy," Proceedings of the Performance, Computing, and Communications Conference 2002 on 21st IEEE International, 2002, pp. 131-140, IEEE Computer Society, Washington D.C., USA.

Border et al. "Performance Enhancing Proxies Intended to Mitigate Link-Related Degradations," Network Working Group Request for Comments: 3135 (Jun. 2001).

Bungum "Transmultiplexing, Transcontrol and Transscrambling of MPEC-2/DVB Signal", Int'l Broadcasting Convention, London, GB, Sep. 12, 1996, pp. 288-293.

Caceres et al., "Web Proxy Caching: The Devil Is in the Details," Proceedings of the Workshop on Internet Server Performance, Jun. 1998, pp. 111-118, Scientific Literature Digital Library, Madison, Wisconsin, USA.

Chakrabarti, Samidy; "Low-Bandwidth Web Access with Tandem Proxies"; 2002, Department of Electrical Engineering, Massachusetts Institute of Technology, pp. 1-64.

Deshpande et al., "Selective Markov Models for Predicting Web-Page Accesses," ACM Transactions on Internet Technology, 2004, pp. 163-184, vol. 4, Issue 2.

Factor et al., "Compression in the Presence of Shared Data," International Journal of Computing and Information Sciences, Jun. 2001, pp. 29-41, vol. 135, Issue 1-2.

Fan et al., "Summary Cache: A Scalable Wide Area Web Cache Sharing Protocol," Proceedings of the IEEE/ACM Transactions on Networking, Jun. 2000, vol. 8, No. 3, pp. 281-293.

Feldmeier et al., "Protocol Boosters," IEEE JSAC, Apr. 1998, pp. 437-444, vol. 16, Issue 3.

Franaszek et al. "Parallel compression with cooperative dictionary construction" Data Compression Conference, 1996 DCC '96. Proceedings, Mar. 31-Apr. 3, 1996, pp. 200-209.

Griffoen et al., "Automatic Prefetching in a WAN," Proceedings of the IEEE Workshop on Advances in Parallel and Distributed Systems, Oct. 1993, Technical Report # CS243-93, pp. 8-12.

Griffoen et al., "Reducing File System Latency Using a Predictive Approach," Proceedings of the USENIX Summer 1994 Technical Conference on USENIX, Jun. 1994, vol. 1.

Housel et al., "Emulator Express: A System for Optimizing Emulator Performance for Wireless Networks," IBM Systems Journal, 2000, pp. 384-402, vol. 39, Issue 2.

Johnson "Identifying Redundancy in Source Code Using Fingerprints," Oct. 25-28, 1993 *Proceedings of CAS CON '93*, Toronto, Ontario, Canada, pp. 171-183.

Kahol et al., "A Strategy to Manage Cache Consistency in a Disconnected Distributed Network," IEEE. Transactions on Parallel and Distributed Systems, Jul. 2001, pp. 686-700, vol. 12, Issue 7, IEEE Computer Society. Los Alamitos, California, USA.

Knutsson et al.; "Transparent Proxy Signalling," at URL=http://nsg.cs.princeton.edu/publication/proxy_jcn_01.pdf; printed Dec. 5, 2008; pp. 1-11.

Lei et al., "An Analytical Approach to File Prefetching," Proceedings of the Annual Conference on USENIX Annual Technical Conference, Jan. 1997, pp. 1-12, Anaheim, California, USA.

Lin et al. "Code compression techniques using operand field remapping" Computers and Digital Techniques, IEEE Proceedings vol. 149, Issue 1, Jan. 2002, pp. 25-31.

Manber et al., "A Text Compression Scheme That Allows Fast Searching Directly in the Compressed File", Department of Computer Science, Mar. 1993, pp. 1-12, Technical Report #93-07, University of Arizona, Tucson, Arizona.

Manber et al., "Finding Similar Files in a Large File System" Department of Computer Science, Oct. 1993, pp. 1-10, Technical Report #93-33, University of Arizona, Tucson, Arizona.

Manber et al., "GLIMPSE: A Tool to Search Through Entire File Systems", Department of Computer Science, Oct. 1993, pp. 1-10, Technical Report #93-34, University of Arizona, Tucson, Arizona.

Mellia et al., "TCP Smart-Framing: Using Smart Segments to Enhance the Performance of TCP," IEEE, 2001, pp. 1708-1712.

Mogul et al. "Delta encoding in HTTP," Network Working Group Internet-Draft (Oct. 2001).

Muthitacharoen et al., "A Low-bandwidth Network File System," Proceedings of the 18th ACM Symposium on Operating System Principles (SOSP'01), Oct. 21-24, 2001, pp. 174-187.

Oly, James et al., "Markov Model Prediction of I/O Requests for Scientific Applications," Jun. 2002, Proceedings of the 16th International Conference on Supercomputing, pp. 147-155.

Padmanabhan et al., "Using Predictive Prefetching to Improve World Wide Web Latency," IEEE Transactions on Antennas and Propagation, 26(3):22-36 (1996).

Rhea et al., "Value-Based Web Caching," Proceedings of the 12th International Conference on World Wide Web, Budapest, Hungary, May 2003, pp. 619-628, ACM, New York, New York, USA.

Rodriguez et al., "TPOT: Translucent Proxying of TCP," Computer Communications, V.24, No. 2, Feb. 2001.

Sayood et al., "Recursively Indexed Quantization of Memoryless Sources", IEEE Transactions on Information Theory, Sep. 1992, pp. 1602-1609, vol. IT-38, No. 5.

Spring et al., "A Protocol-Independent Technique for Eliminating Redundant Network Traffic," Proceedings of ACM SIGCOMM,Computer Communication Review, Oct. 2000, pp. 87-95, vol. 30, Issue 4.

Tolia et al., "An Architecture for Internet Data Transfer," Third Symposium on Networked Systems Design and Implementation (NSDI'06), May 2006, San Jose, California, USA.

Yang, Qiang et al., "Mining Web Logs for Prediction Models in WWW Caching and Prefetching," Aug. 2001, Proceedings of the Seventh ACM SIGKDD International Conference on Knowledge Discovery and Data Mining KDD'01, San Francisco, California, pp. 473-478.

\* cited by examiner

CONNECTION FORWARDING

CROSS-REFERENCES TO RELATED APPLICATIONS

This application is a continuation application of U.S. patent application Ser. No. 12/331,257, filed Dec. 9, 2008 (now U.S. Pat. No. 8,140,690, issued Mar. 20, 2012), which is a divisional application of U.S. patent application Ser. No. 11/377,906, filed Mar. 15, 2006, which claims priority to U.S. Provisional Patent Application No. 60/663,366, filed on Mar. 18, 2005, each of which are incorporated by reference herein for all purposes.

This application is related to U.S. patent application Ser. No. 10/285,315, filed Oct. 30, 2002 (now U.S. Pat. No. 7,120,666, issued Oct. 10, 2006), entitled "Transaction Accelerator for Client-Server Communication Systems," hereafter referred to as "McCanne I"; and U.S. patent application Ser. No. 10/640,562, filed Aug. 12, 2003 (now U.S. Pat. No. 7,318,100, issued Jan. 8, 2008), entitled "Cooperative Proxy Auto-Discovery and Connection Interception," hereafter referred to as "McCanne IV," each of which are incorporated by reference herein for all purposes.

BACKGROUND OF THE INVENTION

The present invention relates to field of data networks and specifically to systems and methods of improving network performance. Network proxies and other types of network devices can be used to cache or store network data, accelerate network traffic, or otherwise control or affect network traffic between clients and servers.

As used herein, "client" generally refers to a computer, computing device, peripheral, electronics, or the like, that makes a request for data or an action, while "server" generally refers to a computer, computing device, peripheral, electronics, or the like, that operates in response to requests for data or action made by one or more clients. A computer or other device may be considered a client, a server, or both depending upon the context of its behavior.

As used herein, a request can be for operation of the computer, computing device, peripheral, electronics, or the like, and/or for an application being executed or controlled by the client. One example is a computer running a word processing program that needs a document stored externally to the computer and uses a network file system client to make a request over a network to a file server. Another example is a request for an action directed at a server that itself performs the action, such as a print server, a processing server, a database server, a control server, and equipment interface server, an I/O (input/output) server, etc.

A request is often satisfied by a response message supplying the data requested or performing the action requested, or a response message indicating an inability to service the request, such as an error message or an alert to a monitoring system of a failed or improper request. A server might also block a request, forward a request, transform a request, or the like, and then respond to the request or not respond to the request. Generally, a request-response cycle can be referred to as a "transaction" and for a given transaction, some object (physical, logical and/or virtual) can be said to be the "client" for that transaction and some other object (physical, logical and/or virtual) can be said to be the "server" for that transaction.

A client issues request messages to a server, which typically delivers a response message to each request message back to the client. As described in McCanne I and McCanne IV, a network proxy communicating with one or more peer network proxies can provide transaction acceleration, traffic reduction, and other functions over a wide area network interposed between two local area networks (LANs). Typically, in such a configuration, a client's request is intercepted by a client-side network proxy, which is connected with the client via a client LAN, and delivered via the WAN to a server-side network proxy. The server-side network proxy delivers the client request message to the server via a server LAN. The request message may be transformed or processed by the two proxies so that the request message (and possibly future request messages) are more effectively transported across the intervening network than would be true without the use of the cooperating network proxies. A message generally can be structured in any format or data structure suitable for conveying information over a communications network, including a single network packet or multiple network packets.

In these proxy-based systems, packets sent from the client are received at the client-side proxy; packets from the client-side proxy are received at the server-side proxy; and packets from the server-side proxy are received at the server. In many networks, these arrangements from client to server are sufficient to ensure the reverse direction of communication from server to client as well, viz. that packets from the server are received at the server-side proxy, packets from the server-side proxy are received at the client-side proxy, and packets from the client-side proxy are received at the client.

However, in some network environments this reverse direction of communication is more problematic. In particular, a LAN including a client or server can have multiple redundant connections with the WAN. As a result, asymmetric routing can produce situations in which a response packet from server to client may traverse a different path than the path used by a request packet from client to server. Where the proxies can rearrange the communication between client and server without the knowledge or participation of the client or server, reverse traffic that bypasses the proxies and their hidden cooperative arrangements can cause performance degradation or a total failure of the proxied connection between client and server. This problem with network proxies and asymmetric routing is mentioned in "Transparent Proxy Signalling," Knutsson, Bjorn and Peterson, Larry, Journal of Communications Networks, March 2001; however, no solution to this problem is proposed.

It is therefore desirable for a system and method to override the effects described here. It is further desirable for the system and method to redirect related sequences of network traffic through the appropriate WAN or other network connection. It is additionally desirable for the system and method to remain transparent to clients and servers while redirecting network traffic through the appropriate WAN or other network connection.

BRIEF SUMMARY OF THE INVENTION

In an embodiment of the invention, two or more network proxies connected with the same LAN and WAN are identified as neighbors, for example by including explicit configuration of network proxies or by an inference of a neighbor relationship from other information available. Network proxies that are neighbors cooperate to overcome the effects of asymmetric routing and other effects by forwarding packets to each other as necessary, such as to ensure that related sequences of network traffic are processed by the same network proxies.

In an embodiment, the proxy in a neighbor group that intercepts a new connection initiation by a client, for example by receiving a SYN packet, is considered the "owning proxy" of that connection. Upon receiving a new connection initiation by a client, the owning proxy first conveys to all of its neighboring proxies identifying information about the new connection, then opens its inner connection across the WAN to a counterpart network proxy to further communicate the new connection initiation of the client. In some cases, the information is not conveyed to all neighboring proxies, but to some of them. In such cases, it might help to simply consider that the uninformed neighboring proxies are not in fact neighbors even though they might qualify to be neighbors.

In an embodiment, the other proxies in the neighbor group use the identifying information they have received from the owning proxy to handle packets that might otherwise bypass the owning proxy due to asymmetric routing or other network behaviors. A neighbor proxy that receives a packet matching the identifying information might alter the addressing information of the packet so that it is received by the owning proxy. The owning proxy then can be expected to handle the packet in much the same way that it would handle a packet that it had received directly.

In an embodiment, a neighbor relationship can be explicitly ended by the owning proxy or the neighbor proxy. When a neighbor relationship is ended, the neighbor proxies discard the identifying information. In another embodiment, a neighbor proxy can use the identifying information to query the owning proxy for the status of the corresponding connection. The neighbor proxy discards that information if the owning proxy indicates that the connection has closed, or if the owning proxy does not recognize the connection, or if the owning proxy fails to respond.

BRIEF DESCRIPTION OF THE DRAWINGS

The invention will be described with reference to the drawings, in which.

In the drawings, the use of identical reference numbers indicates similar components.

DETAILED DESCRIPTION OF THE INVENTION

Figure 1:
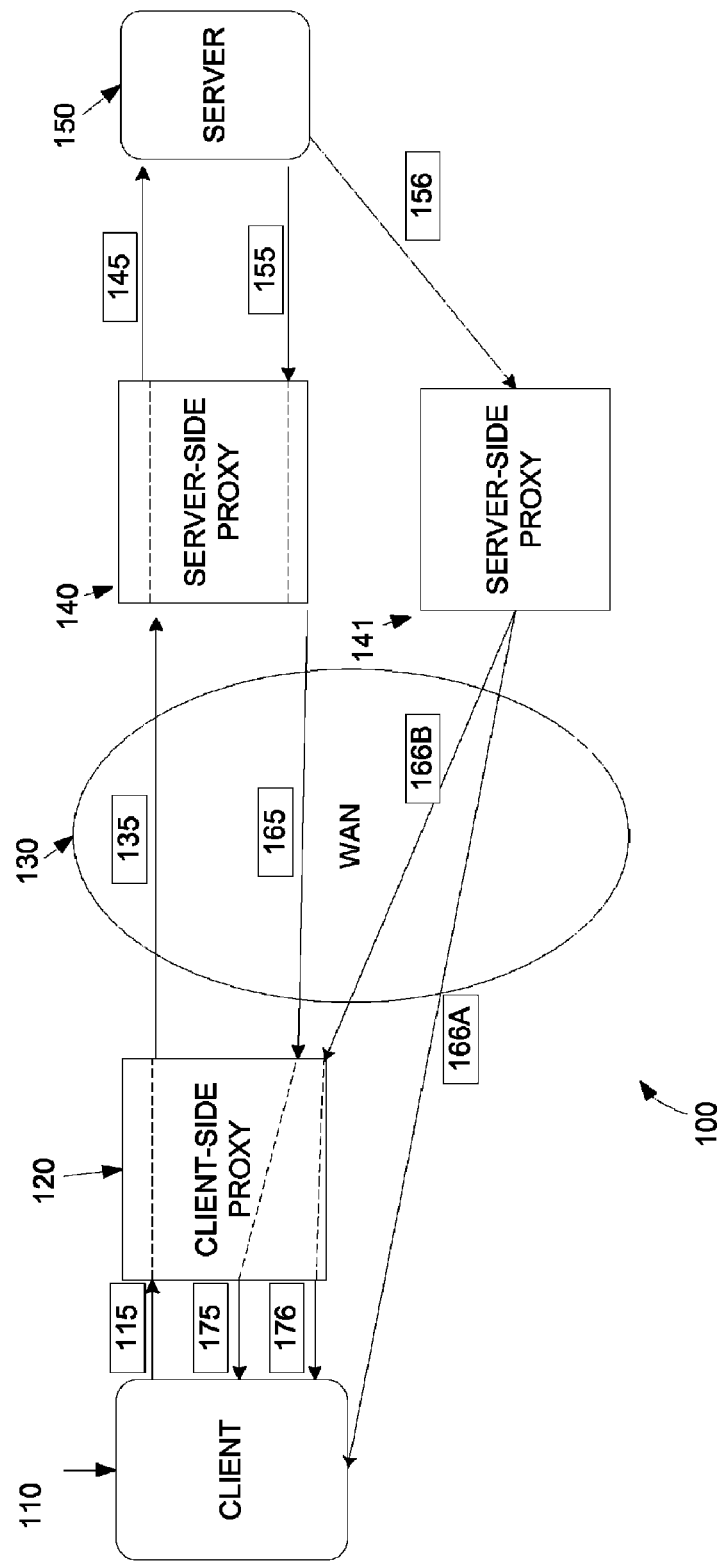
FIG. 1 illustrates an example network and potential problems caused by asymmetric routing.

FIG. 1 illustrates an example network 100 and potential problems caused by asymmetric routing. FIG. 1 shows communication between client 110 and server 150 across a wide-area network (WAN) 130, where the communication is mediated by two proxies, a client-side proxy 120 and a server-side proxy 140. In this example network configuration, a message 115 sent by client 110 and addressed to server 150 is intercepted by client-side proxy 120. Client-side proxy 120 sends message 135 to server-side proxy 140.

In some applications, message 135 is identical to message 115. In other applications, for example if client-side proxy 120 includes network acceleration or caching functions, client-side proxy 120 transforms message 115 into an equivalent message 135 that may differ from message 115 in many ways, including size, encoding, framing, addressing, or other aspects. The server-side proxy 140 receives message 135 and transforms it into message 145, which is identical to, or an acceptable substitute for, original message 115. As network 100 is configured, the two proxies 120 and 140 are invisible in their effect: client 110 and server 150 send and receive messages that are identical to, or an acceptable substitute for, what would occur if message 115 were simply sent directly to server 150 from client 110.

A similar process applies to messages sent in the reverse direction: message 155 is addressed to client 110 but is intercepted by server-side proxy 140. Server-side proxy 140 sends message 165 to client-side proxy 120. In some applications, message 165 is a transformation of message 155. Message 165 may differ from message 155 in many ways, including size, encoding, framing, addressing, or other aspects. The transformation that produces message 165 from message 155 may be entirely different from the transformation that produced message 135 from message 115. When received by client-side proxy 120, message 165 is transformed into message 175, which is identical to, or an acceptable substitute for, original message 155. Some improvements that such interceptions can provide are shown in McCanne I.

In some applications, client-side proxy 120 and server-side proxy 140 form an association with the first passage of messages from client 110 to server 150 via client-side proxy 120 and server-side proxy 140. Information about that association is used to arrange a similar transformation for messages sent in the reverse direction.

Asymmetrical routing occurs when an initial message and a subsequent message between the client 100 and the server 150 pass through one or more different network proxies or other LAN to WAN connections. This can occur if there are redundant links between WAN 130 and server 150 or client 110. One or more redundant links are commonly used for load balancing and improved reliability. As shown in FIG. 1, server 150 is connected with WAN 130 via server-side proxy 140 and an additional server-side proxy 141.

In the example shown, if conventional network routing schemes are employed, there is no guarantee that messages from server 150 to client 110 will traverse the identical link that was traversed by messages from client 110 to server 150, resulting in so-called asymmetric routing. For example, an initial communication between client 110 and server 150, using messages 115, 135, and 145, passes through server-side proxy 140 to reach server 150, but the response might not.

For example, a return communication of message 156 may be intercepted by a different server-side proxy 141. Server-side proxy 141 does not know about client-side proxy 120 or the association between client-side proxy 120 and server-side proxy 140. As a result, the server-side proxy 141 treats message 156 as it would any other message that it received without additional information, e.g., passing it through unaltered as message 166. Message 166 then crosses the WAN 130 on its way to client 110. In some arrangements, message 166a is received directly by client 110, since it is addressed to client 110; in other arrangements, client-side proxy 120 intercepts all traffic to client 110, but will pass message 166b through unaltered to client 110 as message 176. In either case, the message 156 originally sent from server 150 to client 110 does not benefit from the association of client-side proxy 120 and server-side proxy 140.

Such "one-sided" or "half-way" communication means that only one direction of traffic can benefit from the transformations performed by proxies 120, 140, and 141. In some cases, such communication patterns may violate rules for communication between client 110 and 150, leading to communication breakdown. A similar problem occurs when there is no second server-side proxy 141 or when no server-side proxy 140, 141 receives message 156, so that it is simply sent unchanged from server 150 to client 110.

Figure 2A:
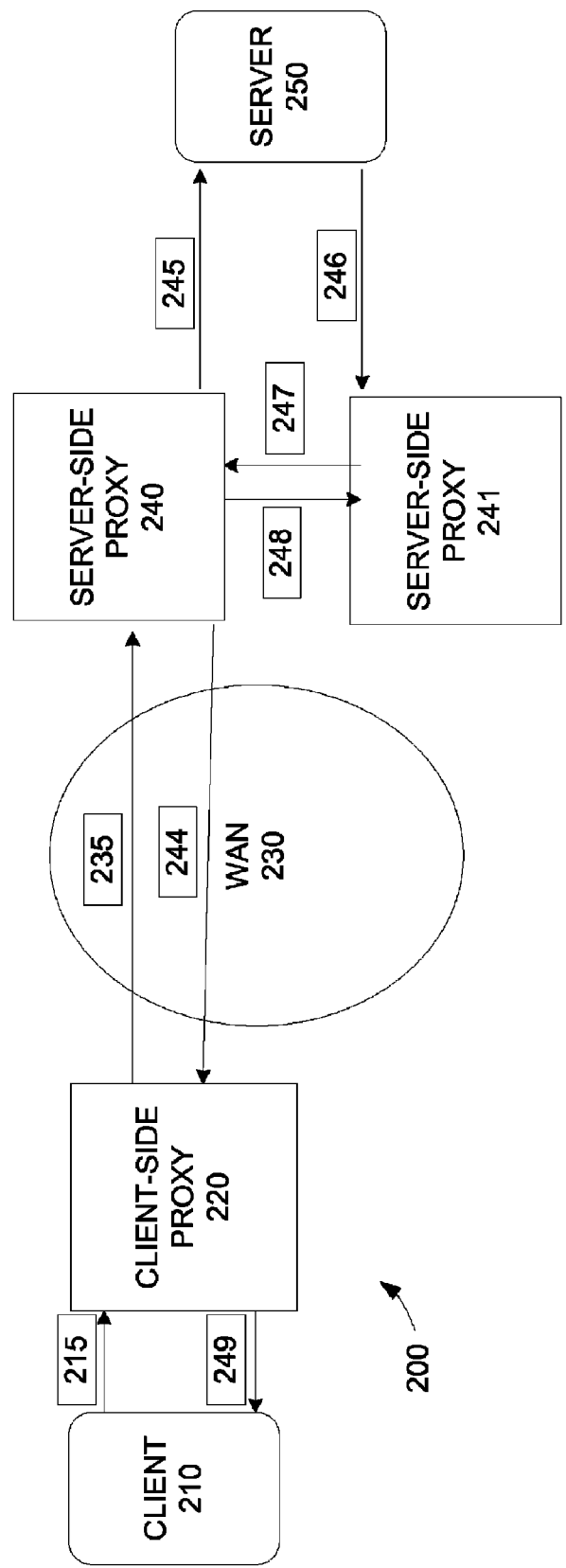
FIGS. 2A and 2B illustrate examples of networks and improved network traffic flow according to embodiments of the invention.

FIG. 2 illustrates example networks having improved network traffic flow according to embodiments of the invention. FIG. 2A illustrates a network 200 similar to network 100 described above. In an embodiment of the invention, server-side proxies 240 and 241 of network 200 have been configured as neighbors, so each can communicate with the other and/or has some awareness of the other.

A message 215 sent by client 210 and addressed to server 250 is intercepted by client-side proxy 220. The client-side proxy 220 sends message 235 to a server-side proxy 240. Message 235 may be identical to message 215 or a transformation of message 215 that differs in ways including size, encoding, framing, addressing, and/or other aspects.

When message 235 is received by server-side proxy 240, an additional step takes place if message 235 is the establishment of a new client/server connection: in such a case, server-side proxy 240 provides new-connection information 248 derived from message 235 to neighbor server-side proxy 241. Neighbor server-side proxy 241 stores that new-connection information 248 and associates it with owning server-side proxy 240.

Server-side proxy 240 also transforms message 235 into message 245, which is identical to, or an acceptable substitute for, original message 215. Thus, the two proxies 220 and 240 are invisible in their effect: client 210 and server 250 send and receive messages that are identical to, or an acceptable substitute for, what would occur if message 215 were simply sent directly to server 250. For example, network traffic communicated from server-side proxy 240 to server 250 might have the source address of client 210.

For communications between the server 250 and the client 210, neighbor server-side proxy 241 may receive message 246 addressed to client 210 from server 250. Upon receiving communications, such as message 246 from the server 250, neighbor server-side proxy 241 uses its stored new-connection information 248 to determine that message 246 belongs to a connection made through server-side proxy 240. Of course, server-side proxy 240 can receive the message and handle it directly. Such message flows are not shown in FIG. 2A, but might be expected to proceed as shown in FIG. 1.

In response to this determination, server-side proxy 241 forwards message 247 to server-side proxy 240, in effect "forwarding" the connection to its handling proxy. Server-side proxy 240 then processes message 247. Using information about its association with client-side proxy 220, server-side proxy 240 transforms message 247 into message 244, which is in turn sent across WAN 230. Client-side proxy 220 then transforms message 244 into message 249, where message 249 is identical to, or an acceptable substitute for, original message 246.

Messages can be forwarded between neighboring network proxies in a number of different ways. In an embodiment, a forwarding server-side proxy changes the destination address of a message to the address of another neighboring server-side proxy. In one implementation of this embodiment, the forwarding proxy does not change the source address of the forwarded message to match its own address and instead retains the source address of the message, for example the server 250. The proxy receiving the forwarded message maintains a connection state internally corresponding to a connection between itself and the original source of the message. Thus, to the proxy receiving the forwarded message from a neighboring proxy, the forwarded message appears to have been received from the original source of the message, rather than from the neighboring proxy.

In another embodiment, a message is forwarded from proxy 241 to a neighboring proxy by encapsulating the entire message in another message, for example in a generic routing encapsulation ("GRE") tunnel established between neighboring proxies. In still another embodiment, a message is forwarded from a forwarding proxy to a neighboring proxy by extracting payload and destination information from original message and sending the payload in a suitable data structure across a TCP, SCTP, or similar connection between the proxies.

In general, messages can be forwarded between neighboring network proxies at the level of detection and forwarding of one or more network packets comprising each message, at the higher-level of semantic request and response messages, or at any intermediate level of processing.

Figure 2B:
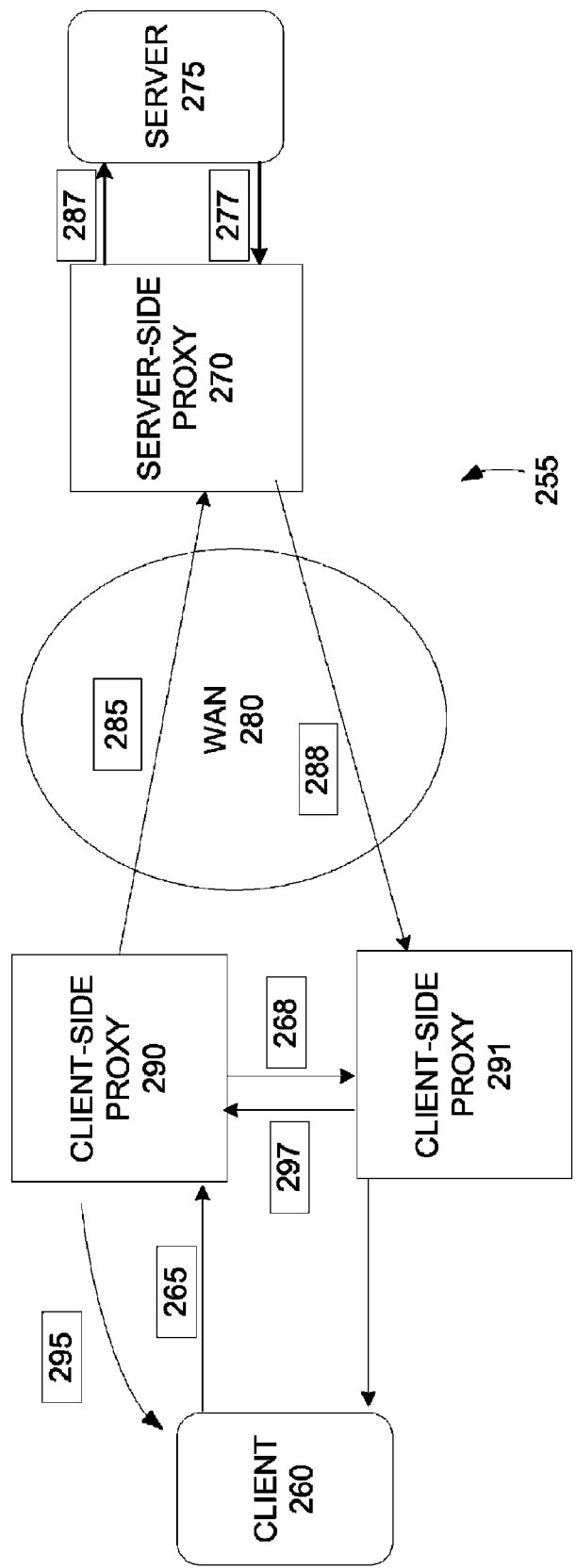

FIG. 2B illustrates an example network 255 according to an embodiment of the invention. Network 255 is similar to network 200, except that there are two client-side network proxies. In this example, client-side proxies 290 and 291 of network 255 have been configured as neighbors, so each can communicate with the other and/or has some awareness of the other.

A message 265 sent by client 260 and addressed to server 275 is intercepted by client-side proxy 290. Client-side proxy 290 sends a message 285 to server-side proxy 270. Message 285 may be identical to message 265 or a transformation of message 265 that differs in ways including size, encoding, framing, addressing, and/or other aspects.

When message 265 is received by client-side proxy 290, an additional step takes place if message 265 is the establishment of a new client/server connection. In such a case, client-side proxy 290 provides new-connection information 268 derived from message 265 to neighboring client-side proxy 291. Neighbor client-side proxy 291 stores that new-connection information 268 and associates it with owning client-side proxy 290.

Server-side proxy 270 receives message 285 and transforms it into message 287, which is identical to, or an acceptable substitute for original message 265. Thus the two proxies 290 and 270 are invisible in their effect: client 260 and server 275 send and receive messages that are identical to, or an acceptable substitute for what would occur if message 265 were simply sent directly to server 275. For example, network traffic communicated from server-side proxy 270 to server 275 might have the source address of client 260.

For communications between the server 275 and the client 260, the neighbor client-side proxy 291 may receive messages from the server 275. For example, server 275 can send message 277 directed to client 260 and server-side proxy 270 can intercept message 277 and can transform it into message 288, which can be identical to message 277 or a transformation of message 277 that differs in ways including size, encoding, framing, addressing, and/or other aspects. For example, message 288 can be a compressed version of message 277.

Due to the routing characteristics of wide area network 280, message 288 might be received by either client-side proxy 290 or 291. If message 288 is received by client-side proxy 290, which previously established and therefore "owns" the connection between client 260 and server 275, client-side proxy 290 uses information about its association with server-side proxy 270 and other previously stored information to transform message 288 into message 295, which is in turn sent to client 260. Message 295 is identical to, or an acceptable substitute for, original server message 277.

Alternatively, if message 288 is received by client-side proxy 291, client-side proxy 291 uses stored new-connection information 268 to determine that message 288 belongs to a connection made through client-side proxy 290. In response to this determination, client-side proxy 291 forwards message 288 to client-side proxy 290 via message 297. Client-side proxy 290 then transforms message 297 into message 295, which is in turn sent to client 260. Message 295 is identical to, or an acceptable substitute for, original server message 277. Various messages, such as forwarding messages, can have a packet-to-packet correspondence with the messages they are transformed from, or not.

As with other embodiments, messages can be forwarded between neighboring network proxies in a number of different ways. In an embodiment, a forwarding client-side proxy changes the destination address of a message to the address of another neighboring client-side proxy. In one implementation of this embodiment, the forwarding proxy does not change the source address of the forwarded message to match its own address and instead retains the source address of the message, for example the server 275. The proxy receiving the forwarded message maintains a connection state internally corresponding to a connection between itself and the original source of the message. Thus, to the proxy receiving the forwarded message from a neighboring proxy, the forwarded message appears to have been received from the original source of the message, rather than from the neighboring proxy.

In another embodiment, a message is forwarded from proxy 291 to neighboring proxy by encapsulating the entire message in another message, for example in a GRE tunnel established between neighboring proxies. In still another embodiment, a message is forwarded from a forwarding proxy to a neighboring proxy by extracting payload and destination information from original message and sending the payload in a suitable data structure across a TCP, SCTP, or similar connection between the proxies.

As discussed above, messages in general can be forwarded between neighboring network proxies at the level of detection and forwarding of one or more network packets comprising each message, at the higher-level of semantic request and response messages, or at any intermediate level of processing.

Although FIGS. 2A-2B show the neighbor configuration, new-connection information, and forwarding occurring at either the server-side proxy or client-side proxy, similar techniques may also be applied with both client-side and server-side proxies. Thus it is possible for a client-server exchange of messages to cause new-connection information to be sent to client-side neighbor proxies, then cause new-connection information to be sent to server-side neighbor proxies, then for a message to be forwarded among server-side proxies, and then for a message to be forwarded among client-side proxies. The number of neighbor proxies and the details of the new-connection information may be different on the client-side and on the server-side. In addition, these techniques can be used whether a connection is initiated at the client or the server, as appropriate.

In additional embodiments, proxies may be nested. For example, WAN 230 may actually be implemented as an actual WAN bracketed by a different set of client-side proxies and server-side proxies. For such a nested collection of proxies, one pairing of client-side and server-side proxies might have a non-zero number of neighbor proxies on zero, one, or both sides of the WAN; and separately, the other pairing of client-side and server-side proxies might have a non-zero number of neighbor proxies on zero, one, or both sides of the WAN. Such nestings of proxies may extend to arbitrary depth, not only the two levels described here.

Figure 3:
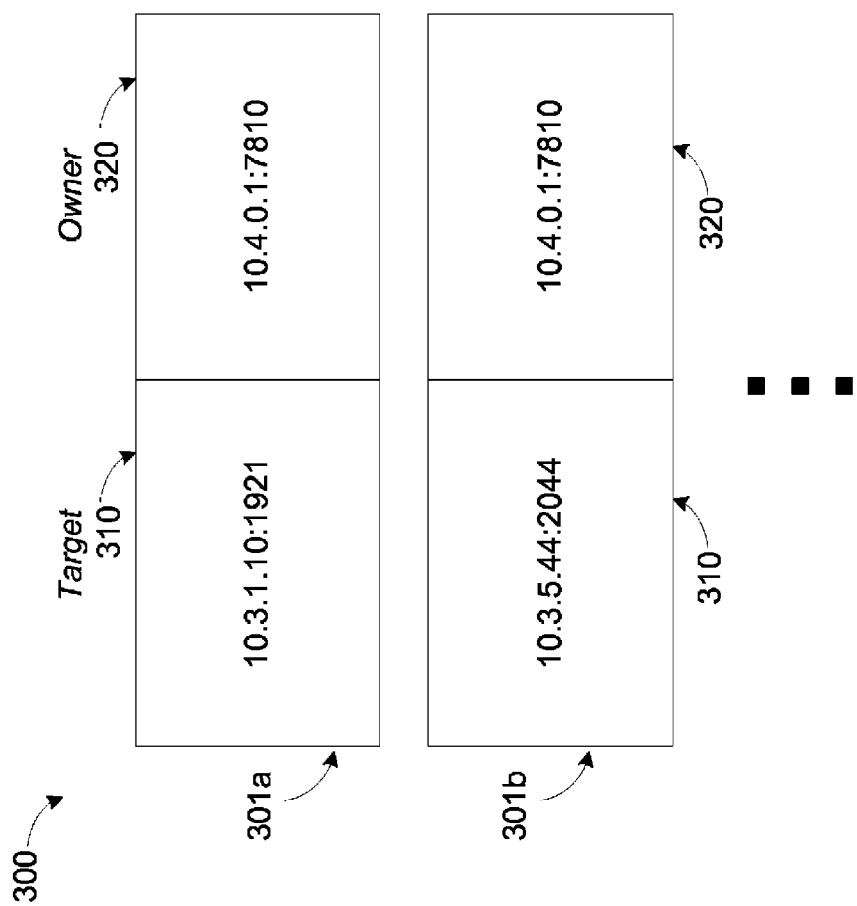
FIG. 3 illustrates an example of the information maintained by a neighboring network connection according to an embodiment of the invention.

FIG. 3 illustrates an example 300 of a data structure for conveying the information maintained by a neighboring network connection according to an embodiment of the invention. FIG. 3 shows a portion of the neighbor information maintained by a proxy, based on new-connection messages received. Entries 301*a* and 301*b* each comprise a target element 310 and an owner element 320. The meaning of each entry is that for any traffic received at this device addressed to the target, that traffic should be forwarded to the corresponding owner. Thus entry 301*a* allows a neighbor receiving traffic destined for 10.3.1.10:1921 to instead forward it to the owning proxy at 10.4.0.1:7810. Entry 301*b* means that traffic destined for 10.3.5.44:2044 should also be forwarded to the same owning proxy. (Examples herein use RFC 1918 private addresses to avoid any inadvertent reference to an actual network; public addresses can, of course, appear in the data structure.)

FIG. 3 is intended only to show the nature of the information stored and its relationship; the actual data structure is likely to include other mechanisms to allowing rapid search, cheap insertion/deletion, accommodating very large collections of information, and reclaiming old or unused entries. In addition, some embodiments will use additional information to distinguish entries, such as source address, source port, protocol number, DSCP code point, or other information readily available from received traffic. Finally, some embodiments will use forms of pattern-matching or partial specification to allow compact representations of large classes of traffic. All such likely adaptations are straightforward for one skilled in the arts. The "neighbor table" partially shown in FIG. 3 can be stored in local memory of a proxy device, memory of a computer executing a software proxy, etc.

Figure 4:
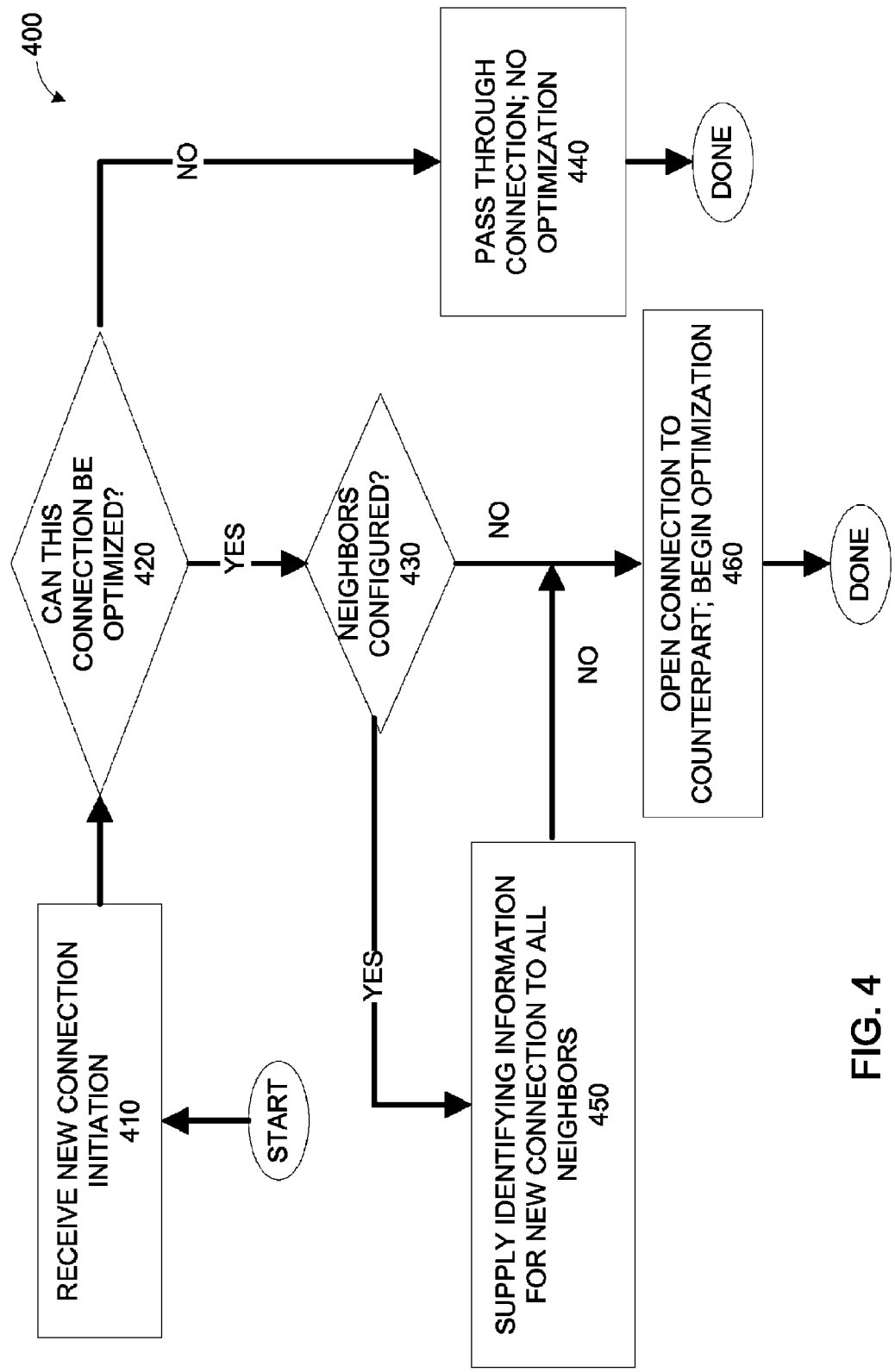
FIG. 4 illustrates a method of initiating a new connection according to an embodiment of the invention.

FIG. 4 illustrates a method 400 of initiating a new connection according to an embodiment of the invention. This method can be performed by one or more components in a network and/or embodied in computer-readable instructions to perform the method. In step 410, a proxy receives a message. In step 420, the proxy determines whether this connection can be optimized. Some connections may not be optimizable because of configuration rules, or there may be no counterpart proxy available in a suitable network location for the client and server. If the connection is not optimizable, in step 440 the proxy passes through the connection without processing it. In other embodiments, method 400 includes steps of processing the messages at the higher-level of semantic request and response messages, or at any intermediate level of processing, rather than at the level of detection and forwarding of one or more network packets comprising each message.

If the connection is optimizable, in step 430 the proxy determines if it has neighbors. If so, in step 450 the proxy, referred to here as the "owner proxy," supplies new-connection information to each of its neighbors. In an embodiment, the new-connection information can be communicated with neighboring proxies using unicast, multicast, or broadcast techniques. Some proxies that would otherwise qualify as neighbors can be treated as non-neighbors, where appropriate.

Regardless of whether it has neighbors or not, in step 460 the owner proxy begins applying optimizations or transformations to connection traffic, in cooperation with its counterpart proxy.

Figure 5:
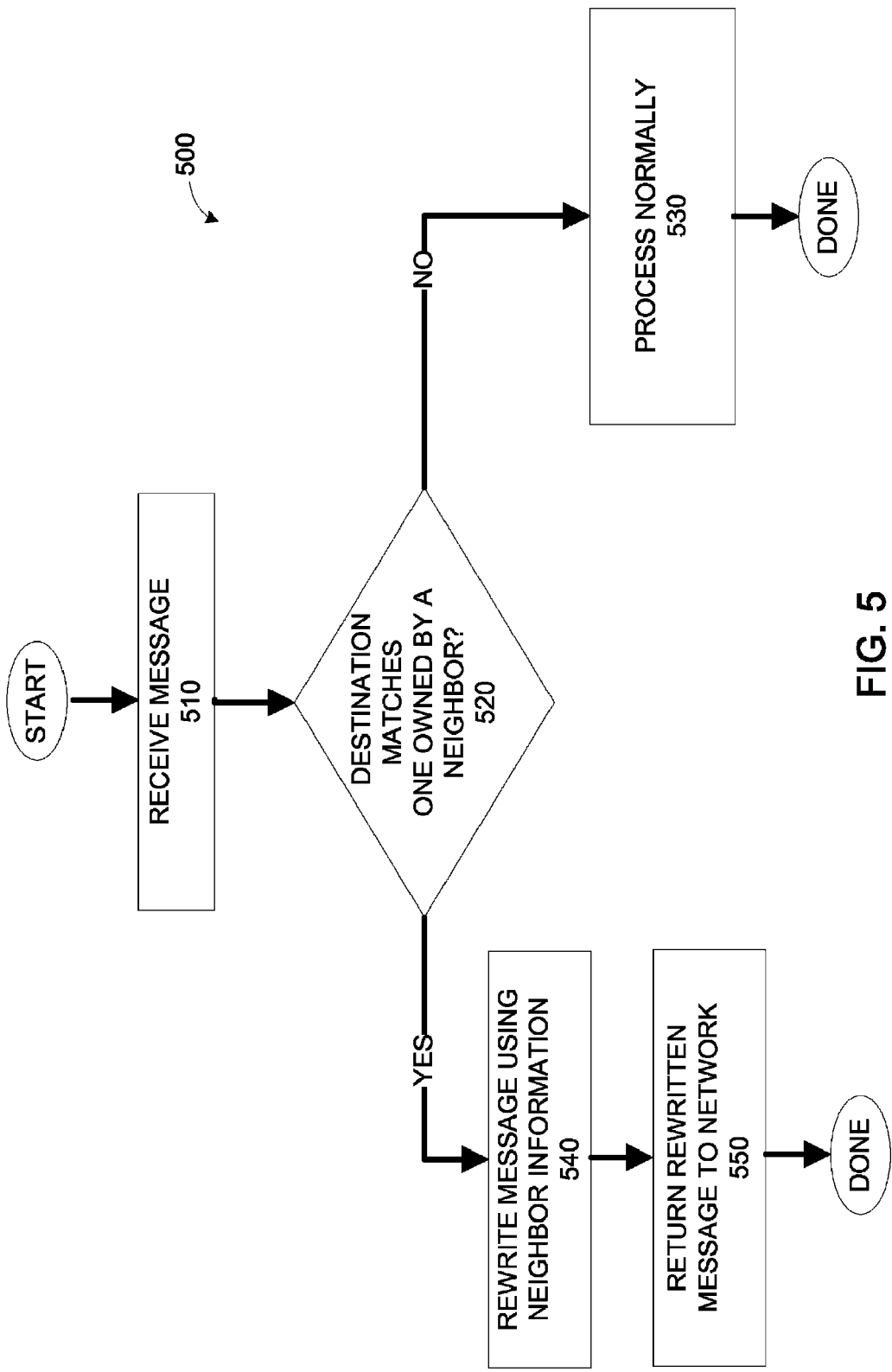
FIG. 5 illustrates a method of processing network traffic associated with a connection according to an embodiment of the invention.

FIG. 5 illustrates a method of processing network traffic associated with a connection according to an embodiment of the invention that begins with a proxy receiving a message. In step 510, the proxy receives the message. In step 520, the proxy determines whether the message's destination matches one in its neighbor table, such as that diagrammed in FIG. 3. If the message's destination does not match any entry in the neighbor table, the process continues with step 530 wherein the proxy processes the message normally. This can include forwarding the message to its destination and optionally transforming the message for purposes of caching or network acceleration or other operation.

Conversely, if in step 520 it is determined that the message does match an entry in the neighbor table, the proxy can rewrite (step 540) and forward (step 550) the message or an equivalent thereof to the appropriate neighbor network proxy for processing. Forwarding can be accomplished using a variety of different techniques, including the address swapping, tunneling, and payload extraction techniques discussed above. As described previously, embodiments of method 500 can include processing the messages comprising one or more packets at the higher-level of semantic request and response messages, at any intermediate level of processing, or at the level of detection and forwarding of the one or more network packets comprising each message. A message can be part of a packet, comprise one packet per message, or comprise a plurality of pockets, depending on context.

In a further embodiment, network proxies can be dynamically added. In one implementation, newly added proxies receive and process all network traffic normally, as if their neighbor tables were empty. As a result, some types of network transactions will be disrupted due to the effects of asymmetric routing and other network effects, such as those described previously. Clients and servers will recover from the disrupted network transactions by initiating a new network connection. The new network connection will be intercepted by the network proxies and result in new connection information being forwarded to a newly added proxy, thereby updating its neighbor table.

Figure 6:
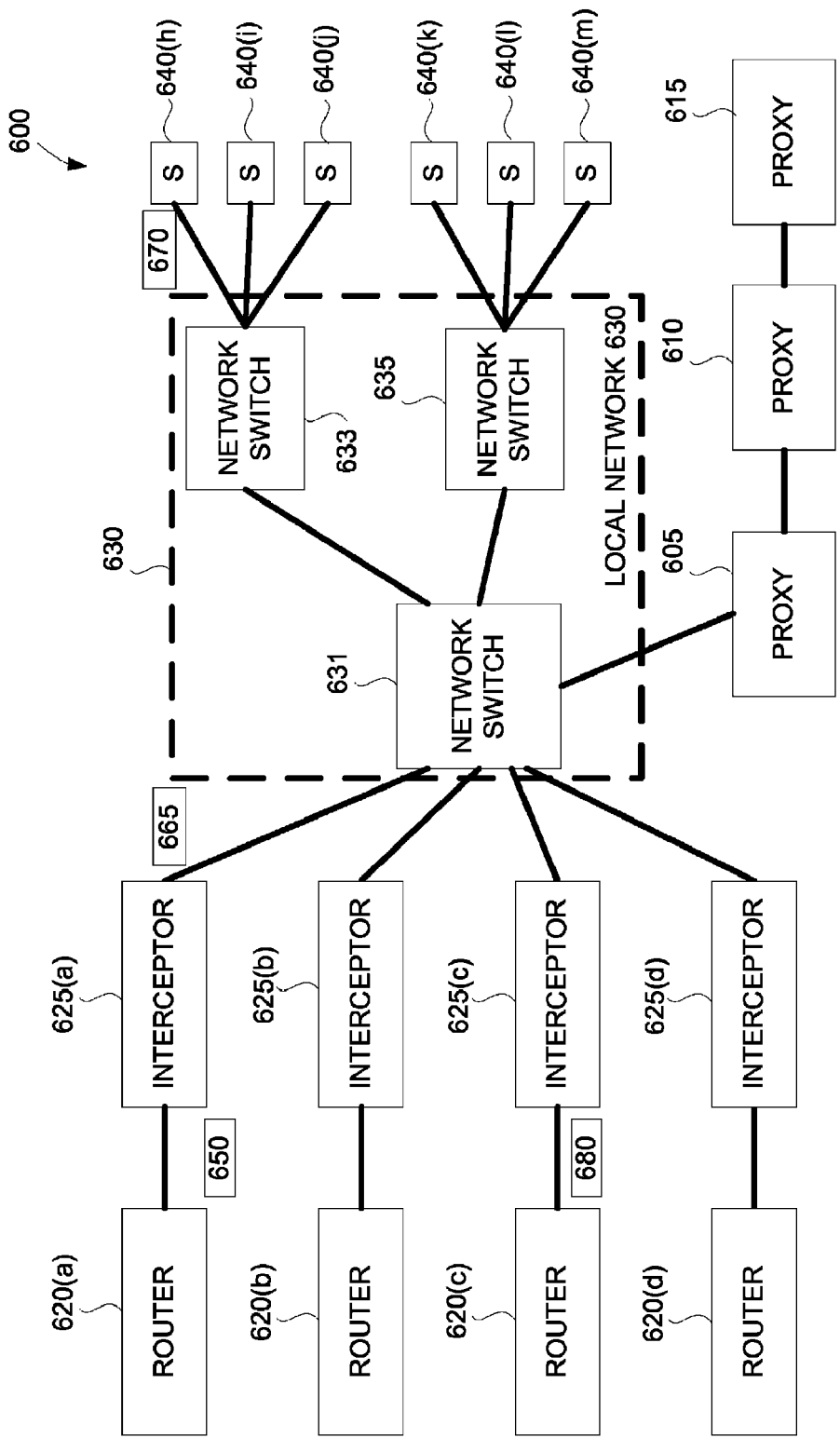
FIG. 6 illustrates an additional network according to an embodiment of the invention.

FIG. 6 illustrates an additional network 600 according to an embodiment of the invention. Network 600 is shown including a set of server-side proxies 605, 610, and 615. Other network elements might exist that are not shown. As with the other embodiments, each of the set of server-side proxies can be associated with one or more client-side proxies, which are omitted from FIG. 6 for clarity. The association between client-side and server-side proxies enables transformations that improve network performance and perform possibly other roles. In this network configuration 600, server-side proxies do not have to be in-line with the connections with the wide-area network.

Network 600 includes a set of routers 620. Each of the set of routers 620 has a connection with one or more wide-area networks. A set of interceptor modules 625 are connected with the set of routers 620. As explained in detail below, the set of interceptor modules 625 are adapted to intercept and, if necessary, redirect network traffic to preserve routing symmetry. In an embodiment, each of the set of routers 620 is associated with one of the set of interceptor modules 625. In alternate embodiments, routers and interceptor modules may be associated in different ratios.

The set of interceptor modules are connected with each other and the set of server-side proxies 605, 610, and 615 via a local network 630 that includes one or more network switches and other networking devices, such as network switches 631, 633, and 635. A set 640 of one or more servers, each labeled "S" in FIG. 6, is also connected with local network 630. The set of servers 640 provide applications, information, and services to one or more clients. For clarity, clients are omitted from FIG. 6, but might be coupled to routers 620.

The set of interceptor modules 625 preserve routing symmetry for network traffic between clients and the set of servers 640. For example, a client sends an initial message 650 to a server. Initial message 650 can be communicated from the client, via a client-side network proxy, and through a wide-area network, not shown, to reach network 600. Message 650 may be directed at a specific one of the set of servers 640 or in general to any of the set of servers 640 or a subset thereof.

Upon receipt of initial message 650 via router 620(a) of the set of routers 620, message 650 is passed to associated interceptor module 625(a). If routing symmetry needs to be preserved for this and possibly subsequent communications with this client, interceptor module 625(a) selects an appropriate server-side proxy to associate with the client's client-side proxy. Embodiments of interceptor module 625(a) can select a server-side proxy in any number of ways to achieve load-balancing or other goals. Example load-balancing schemes can include round-robin, load-based, sticky, mapping using hashes of an IP address or other message property, or any other load-balancing scheme used for manipulating network traffic that is known in the art and suitable for such operations.

In accordance with this selection, interceptor module 625 (a) sends the initial message 650 to the selected server-side proxy. Additionally, interceptor module 625(a) sends a new-connection information message 665 to the each of other interceptor modules of set 625 and stores a copy of this new-connection information for itself. In an embodiment, the new-connection information message 665 is communicated with the other interceptor modules using a unicast, multicast, or broadcast network protocol on the network 630. It should be understood that similar operations could be done with proxy/interceptor pairs other than 620(a)/625(a).

In an embodiment, the new-connection information message 665 includes one or more routing table rules for redirecting network traffic associated with the pertinent client to the selected server-side proxy. In a further embodiment, the routing table rules include one or more rules for redirecting network traffic from the pertinent client to the selected server-side proxy. Additionally, the routing table rules include one or more rules for redirecting network traffic from one or more of the set of servers 640 and directed to that client to the selected server-side proxy.

In further embodiments, network traffic associated with a given client is assigned to a unique port of the selected server-side proxy. In an embodiment, an autodiscovery protocol is used so that the client-side proxy and interceptor modules learn which port to connect with on the selected server-side proxy. In another embodiment, a set of rules on the client-side proxy and/or the interceptor modules define the appropriate port to connect with on the server proxy.

Once the other interceptor modules of set 625 have received the new-connection information message 665, all network traffic associated with the client will be redirected through the selected server-side proxy. For example, a message 670 from server 640(b) directed to the client will travel through local network 630. Upon reaching one of the set of interceptors 625, the receiving interceptor module will match message 670 with its stored new-connection information for the client. In response, that interceptor module will redirect message 670 to the previously selected server-side proxy. The selected server-side proxy will process and/or transform message 670 and then send the resulting message back through any one of the set of interceptor modules 625 and associated one of the set of routers 620 to the client. In another embodiment, the new-connection information is received by the set of routers 620, which processes network traffic in a similar manner.

Similarly, a subsequent message 680 from the client to one of the set of servers 640 will be received by one of the set of interceptors 625, such as interceptor 625(*c*) in this example. Interceptor module 625(*c*) will match message 680 with its stored new-connection information for the client. In response, the interceptor module 625(*c*) will redirect message 680 to the previously selected server-side proxy. The selected server-side proxy will process and/or transform message 680 and then send the resulting message back through local network 630 to one of the set of servers 640.

In an alternate embodiment, the some or all of the network proxies can be integrated with the interceptor modules, such that each combined unit includes a network proxy for processing and transforming associated network traffic, and an interceptor module for monitoring network traffic, creating new-connection information, and using new-connection information to redirect messages as needed to other standalone network proxies or combined interceptor module and network proxy units. In this embodiment, standalone interceptor modules can also be employed to cover additional connections with a wide-area network.

In a further embodiment, network proxies can be dynamically removed from the network. Neighbor proxies receive new-connection information and store this information in a neighbor table. Additionally, in this embodiment, neighbor proxies provide an acknowledgment message to the owner proxy. If the owner proxy does not receive an acknowledgment back from one or more of its neighbor proxies, the owner proxy assumes the non-responsive neighbor proxies are disabled and can purge its own neighbor table of entries associated with the non-responsive neighbor proxies.

The outlined flow is for an embodiment in which each message is unambiguously handled by either the receiving proxy or a neighbor. In some embodiments, it may be possible for a message to be handled either by the receiving proxy or by one of its neighbors. In such an embodiment, where such a choice should be resolved in favor of the receiving proxy, the message processing flow will include a test after receiving a message and before checking for "neighbor ownership" to determine if the message matches one that can be handled by the receiving proxy. If the message can be handled by the receiving proxy, then processing would involve normal processing and no need for the checking step.

Although the invention has been discussed with respect to specific embodiments thereof, these embodiments are merely illustrative, and not restrictive, of the invention. Furthermore, the system architecture discussed above is for the purposes of illustration. The invention can be implemented in numerous different forms including as a stand-alone application or as a module integrated with other applications. Thus, the scope of the invention is to be determined solely by the claims.

What is claimed is:

1. A system, comprising:
a first initiation-side proxy and a second initiation-side proxy;
the first initiation-side proxy comprising:
a) one or more processors;
b) a first network interface, for receiving information at the first initiation-side proxy;
c) logic configured to receive, directly or indirectly via the first network interface, first connection setup information for a first connection being set up between a client and a server; and
d) logic configured to send, to the second initiation-side proxy, second connection setup information, wherein the second connection setup information comprises at least a portion of the first connection setup information; and
the second initiation-side proxy comprising:
a) one or more processors;
b) a second network interface, for receiving information at the second initiation-side proxy;
c) logic configured to store the second connection setup information; and
d) logic configured to receive, directly or indirectly via the second network interface: (1) connection setup response information, and (2) response-side proxy-identifying information that indicates the presence of a response-side proxy; and
e) logic configured to forward, based at least in part on the stored second connection setup information, both the connection setup response information and the response-side proxy-identifying information from the second initiation-side proxy to the first initiation-side proxy;
wherein the first initiation-side proxy further comprises logic configured to establish a second connection between the first initiation-side proxy and the response-side proxy based at least in part on the response-side proxy-identifying information and in response to receiving the connection setup response information.

2. The system of claim 1, wherein the first initiation-side proxy further comprises logic configured to proxy the one or more messages over the second connection in response to receiving one or more messages from the client to the server at the first initiation-side proxy, wherein proxying the one or more messages comprises sending representations of the one or messages over the second connection to the response-side proxy.

3. The system of claim 1, wherein the forwarded connection setup response information comprises at least one of:
1) at least a portion of a message received by the second initiation-side proxy encapsulated using a tunneling protocol;
2) a message having a modified destination address relative to an initial destination address as received by the second initiation-side proxy; and
3) a payload extracted from a message received by the second initiation-side proxy.

4. The system of claim 1, further comprising:
logic, of the second initiation-side proxy, configured to receive third connection setup information for a third connection being set up between a second client and a second server;
logic, of the second initiation-side proxy, configured to send, to the first initiation-side proxy, fourth connection setup information, wherein the fourth connection setup information comprises at least a portion of the third connection setup information;
logic, of the first initiation-side proxy, configured to store the fourth connection setup information;
logic, of the first initiation-side proxy, configured to receive: (1) second connection setup response information, and (2) second response-side proxy-identifying information that indicates the presence of a second response-side proxy;
logic, of the first initiation-side proxy, configured to forward both the second connection setup response information and the second response-side proxy-identifying information from the first initiation-side proxy to the second initiation-side proxy based at least in part on the stored fourth connection setup information; and logic, of the second initiation-side proxy, configured to establish a fourth connection between the second initiation-side proxy and the second response-side proxy based at least in part on the second response-side proxy-identifying information and in response to receiving the second connection setup response information.

5. The system of claim 1, wherein the first response-side proxy is a different response-side proxy than the second response-side proxy.

6. The system of claim 1, wherein the first initiation-side proxy includes logic configured to maintain a connection state internally based on the connection setup response information, the connection state corresponding to a connection between the first initiation-side proxy and the first response-side proxy as if the connection setup response information sent from the second initiation-side proxy to the first initiation-side proxy had been received at the first initiation-side proxy from the first response-side proxy.

7. A method, comprising:

receiving, directly or indirectly via a first network interface, at a first initiation-side proxy comprising one or more processors, first connection setup information for a first connection being set up between a client and a server; and sending, to a second initiation-side proxy comprising one or more processors, second connection setup information, wherein the second connection setup information comprises at least a portion of the first connection setup information;

storing, at the second initiation-side proxy, the second connection setup information;

receiving, directly or indirectly via a second network interface, at the second initiation-side proxy: (1) connection setup response information, and (2) response-side proxy-identifying information that indicates the presence of a response-side proxy;

forwarding, based at least in part on the stored second connection setup information, both the connection setup response information and the response-side proxy-identifying information from the second initiation-side proxy to the first initiation-side proxy; and establishing a second connection between the first initiation-side proxy and the response-side proxy based at least in part on the response-side proxy-identifying information and in response to receiving the connection setup response information.

8. The method of claim 7, further comprising:

proxying the one or more messages over the second connection in response to receiving one or more messages from the client to the server at the first initiation-side proxy, wherein proxying the one or more messages comprises sending representations of the one or messages over the second connection to the response-side proxy.

9. The method of claim 7, wherein forwarding the connection setup response information to the first initiation-side proxy comprises at least one of:

1) encapsulating at least a portion of a message received by the second initiation-side proxy using a tunneling protocol;

2) modifying a destination address of a message received by the second initiation-side proxy; and 3) extracting the payload from a message received by the second initiation-side proxy and sending the payload to the first initiation-side proxy.

10. The method of claim 7, further comprising:

receiving, at the second initiation-side proxy, third connection setup information for a third connection being set up between a second client and a second server;

sending, from the second initiation-side proxy to the first initiation-side proxy, fourth connection setup information, wherein the fourth connection setup information comprises at least a portion of the third connection setup information;

storing, at the first initiation-side proxy, the fourth connection setup information;

receiving, at the first initiation-side proxy: (1) second connection setup response information, and (2) second response-side proxy-identifying information that indicates the presence of a second response-side proxy;

forwarding both the second connection setup response information and the second response-side proxy-identifying information from the first initiation-side proxy to the second initiation-side proxy based at least in part on the stored fourth connection setup information; and establishing a fourth connection between the second initiation-side proxy and the second response-side proxy based at least in part on the second response-side proxy-identifying information and in response to receiving the second connection setup response information.

11. The method of claim 7, wherein the first response-side proxy is a different response-side proxy than the second response-side proxy.

12. The method of claim 7, further comprising:

maintaining, at the first initiation-side proxy, a connection state internally based on the connection setup response information, the connection state corresponding to a connection between the first initiation-side proxy and the first response-side proxy as if the connection setup response information sent from the second initiation-side proxy to the first initiation-side proxy had been received at the first initiation-side proxy from the first response-side proxy.

13. A system, comprising:

a first device and a second device, the first device comprising:

a) one or more processors;

b) a first network interface, for receiving information at the first device;

c) logic configured to receive, directly or indirectly via the first network interface, first connection setup information for a first connection being set up between a first host and a second host; and d) logic configured to send, to the second device, second connection setup information, wherein the second connection setup information comprises at least a portion of the first connection setup information; and the second device, comprising:

a) one or more processors;

b) a second network interface, for receiving information at the second device;

c) logic configured to store, in a memory, the second connection setup information;

d) logic configured to receive, directly or indirectly via the second network interface, connection setup response information;

e) logic configured to forward the connection setup response information to the first device based at least in part on the stored second connection setup information;

f) logic configured to receive, directly or indirectly via the second network interface or another network interface, device identifying information that indicates the presence of a third device; and g) logic configured to forward the device identifying information from the second device to the first device based at least in part on the stored second connection setup information.

14. The system of claim 13, wherein the first device further comprises:

e) logic configured to establish a second connection between the first device and the third device based at least in part on the device identifying information and in response to receiving the connection setup response information.

15. The system of claim 13, wherein the first host is a client that issues requests and the second host is a server that responds to client requests.

16. The system of claim 13, wherein the second host is a client that issues requests and the first host is a server that responds to client requests.

17. The system of claim 13, wherein the first device and the second device are proxies.

18. The system of claim 13, wherein the first device and the second device are routers.

19. The system of claim 13, wherein the first device and the second device are interceptors.

20. The system of claim 13, wherein the first host is an initiator of a transaction and the second host is a responder to the transaction.

21. The system of claim 13, wherein forwarding the connection setup response information is performed in response to a match between a connection identifier obtained at the first device as part of setup of the first connection and a connection identifier obtained at the second device as part of the connection setup response information.

22. A method, performed by one or more computing devices having network connectivity, comprising:

receiving, directly or indirectly via a first network interface, at a first device, first connection setup information for a first connection being set up between a first host and a second host;

sending, from the first device to the second device, second connection setup information, wherein the second connection setup information comprises at least a portion of the first connection setup information;

storing, at the second device, the second connection setup information;

receiving, directly or indirectly via a second network interface, at the second device, connection setup response information;

based at least in part on the stored second connection setup information, forwarding, from the second device to the first device, the connection setup response information;

receiving, directly or indirectly via the second network interface or another network interface, at the second device, device identifying information that indicates the presence of a third device; and based at least in part on the stored second connection setup information, forwarding the device identifying information from the second device to the first device.

23. The method of claim 22, the method further comprising:

in response to receiving the connection setup response information and the device identifying information at the first device, establishing a second connection between the first device and the third device based at least in part on the device identifying information.

24. The method of claim 22, wherein the first host is a client that issues requests and the second host is a server that responds to client requests.

25. The method of claim 22, wherein the second host is a client that issues requests and the first host is a server that responds to client requests.

26. The method of claim 22, wherein the first device and the second device are proxies.

27. The method of claim 22, wherein the first device and the second device are routers.

28. The method of claim 22, wherein the first device and the second device are interceptors.

29. The method of claim 22, wherein the first host is an initiator of a transaction and the second host is a responder to the transaction.

30. The method of claim 22, wherein forwarding the connection setup response information is performed in response to a match between a connection identifier obtained at the first device as part of setup of the first connection and a connection identifier obtained at the second device as part of the connection setup response information.

* * * * *